(12) United States Patent
Saccone et al.

(10) Patent No.: US 8,509,968 B1
(45) Date of Patent: Aug. 13, 2013

(54) SYSTEM AND METHOD FOR REAL-TIME AIRCRAFT EFFICIENCY ANALYSIS AND COMPILATION

(75) Inventors: Gregory T. Saccone, Kirkland, WA (US); Ryan D. Hale, Kent, WA (US); Nicholas P. G. Impert, Bellevue, WA (US); Louis J. Bailey, Covington, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/424,661

(22) Filed: Mar. 20, 2012

(51) Int. Cl.
*G06F 17/00* (2006.01)

(52) U.S. Cl.
USPC ............. 701/3; 701/29.6; 701/31.4; 701/116; 701/117; 701/120; 701/301; 701/500; 244/12.1; 244/12.4; 244/17.11; 244/17.23; 244/39; 340/945; 702/138; 702/144; 60/230; 60/477; 342/36; 416/96 R

(58) Field of Classification Search
USPC .................... 701/3, 4, 7, 14, 29.6, 31.4, 33.4, 701/116, 117, 120, 301, 500; 244/2, 8, 12.1, 244/12.4, 17.11, 17.19, 17.23, 36, 39, 48, 244/49, 219, 120, 130, 201, 203, 218, 53 B; 340/539.13, 945; 702/138, 144; 60/230, 60/477; 342/36; 416/96 R
See application file for complete search history.

(56) References Cited

U.S. PATENT DOCUMENTS

| | | | | |
|---|---|---|---|---|
| 6,538,581 | B2 * | 3/2003 | Cowie | 340/961 |
| 7,196,621 | B2 * | 3/2007 | Kochis | 340/539.13 |
| 7,349,773 | B2 | 3/2008 | Berard | |
| 7,433,779 | B2 | 10/2008 | Deker et al. | |
| 7,647,140 | B2 * | 1/2010 | Demortier et al. | 701/16 |
| 7,797,102 | B2 | 9/2010 | Fortier | |
| 8,010,288 | B2 * | 8/2011 | Bouchet et al. | 701/301 |
| 8,200,377 | B2 * | 6/2012 | Marty et al. | 701/3 |
| 2002/0039072 | A1 | 4/2002 | Gremmert et al. | |
| 2008/0288164 | A1 | 11/2008 | Lewis et al. | |
| 2009/0012663 | A1 | 1/2009 | Mead et al. | |
| 2009/0157288 | A1 | 6/2009 | Bailey et al. | |
| 2010/0049382 | A1 | 2/2010 | Akalinli et al. | |
| 2010/0241345 | A1 | 9/2010 | Cornell et al. | |
| 2011/0050458 | A1 | 3/2011 | Bailey et al. | |
| 2011/0054718 | A1 | 3/2011 | Bailey | |

* cited by examiner

*Primary Examiner* — McDieunel Marc
(74) *Attorney, Agent, or Firm* — Ostrager Chong Flaherty & Broitman P.C.

(57) ABSTRACT

Systems and methods for real-time efficiency and aircraft performance monitoring and delta efficiency calculations between various user- or system-selected phases of flight by determining an efficiency messaging index that gets translated into a messaging profile. That messaging profile is then used to obtain necessary flight and other information from multiple sources. The efficiency calculations and deltas can be used to determine real-time or post-processed benefits, which can then be used to optimize flight(s). Additionally, data is post-processed, which allows the calculation, storage and subsequent usage of efficiency coefficients to enhance the accuracy of the efficiency calculations. There are a number of ways to implement the architecture and order of processing.

21 Claims, 11 Drawing Sheets

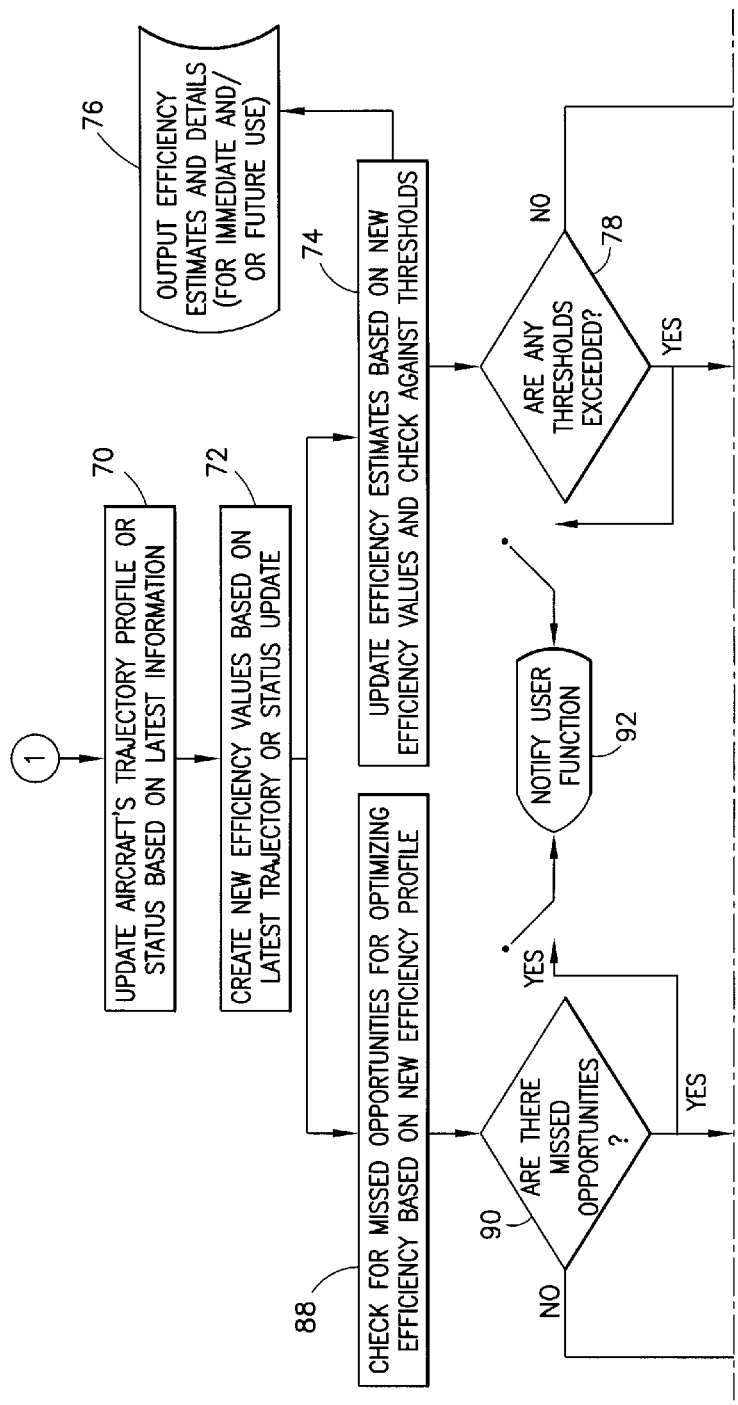

SYSTEM AND METHOD FOR REAL-TIME AIRCRAFT EFFICIENCY ANALYSIS AND COMPILATION

BACKGROUND

This disclosure generally relates to systems and methods for determining the real-time efficiency of the flight path of an aircraft. More particularly, the disclosed embodiments relate to systems and methods for determining the impacts and potential impact of various flight optimization techniques.

Aircraft transmit messages on a periodic basis, in response to specific events on board the aircraft and on-demand from the flight crew or ground system. Additional messages are also available that provide information relevant to aircraft (e.g. surveillance data). The ordering, delivery method, content and timing of the messages define a messaging profile. There are many different sets of messages that may support particular services, each with different messaging needs. In order to fulfill a real-time efficiency analysis, a specific messaging profile is required.

Determining efficiencies achieved enables the measurement of the impacts of various flight optimization techniques. Without detailed and accurate efficiency delta information, it is difficult to know the value of any new implementations that purport to deliver benefits. Efficiency and benefits for aircraft are currently calculated using post-analysis on various flight data. Various efforts have been made to give a rough estimate of potential benefits and savings based solely on a snapshot of data. This can be very accurate depending on the type of data available for use in calculations, but one of the main problems is that it is an analysis after the fact. This means that operators do not have an accurate idea of real-time efficiencies that may be gained, not the real-time benefits realized, and they also lose insight into potential missed efficiencies that might have been advantageous to the flight had they been known when the flight was en route.

There is a need for systems and methods that would allow efficiencies to be continually updated in real time across multiple efficiency parameters and use that information to find and evaluate potential missed efficiency opportunities.

SUMMARY

The subject matter of this disclosure encompasses means for enabling real-time efficiency monitoring and delta efficiency calculations between various user- or system-selected phases of flight by determining an efficiency measuring-promoting messaging profile index (MPI) that is translated into a messaging profile. That messaging profile is then used to obtain necessary flight and other information from multiple sources. Basically a higher-efficiency MPI translates to more messaging required between the aircraft and the ground system or aircraft and other aircraft. The efficiency calculations and deltas can be used to determine real-time or post-processed benefits, which can then be used to optimize flight(s). Additionally, data is post-processed, which allows the calculation, storage and subsequent usage of efficiency coefficients to enhance the accuracy of the efficiency calculations. There are a number of ways to implement the architecture and order of processing.

As used herein, the term "delta efficiency" refers to a change (i.e., difference) between a baseline efficiency value and the latest actual value for a particular parameter. A threshold is the limit of an efficiency delta, i.e., a change in an efficiency parameter from a baseline that the user has set that will result in notification and/or action.

The system disclosed hereinafter comprises means for real-time efficiency analysis of aircraft performance that is able to adapt a messaging profile, based on configuration and adaptation data, that is translated into a message or a series of messages that are sent to aircraft so that the aircraft can provide sufficient information to enable continual efficiency analysis. The system can be either air based (e.g., a system connected to a flight deck or a hand-held, stand-alone system) or ground based (e.g., a computer running at an airline's operational control center).

Various embodiments will be disclosed hereinafter which provide the capability to measure efficiency in real-time. These real-time efficiency calculations can then be used to provide a more complete or customized efficiency picture when combined with historical data and post-flight analysis data. Existing solutions concentrate on post-flight analysis. The system disclosed hereinafter, while making use of post-flight analysis, concentrates more heavily on determining real-time efficiency during the flight by calculating the necessary messaging profile indices. In addition, this system provides a mechanism for identifying potential increased efficiency opportunities and then notifying other interested systems that those opportunities are available.

In order to fulfill a real-time efficiency analysis, a specific messaging profile is required. The messages that make up this profile will be dependent on the level of monitoring that is desired. The efficiency monitoring system disclosed hereinafter also addresses creating messaging profiles based on the desired accuracy of real-time efficiency monitoring. This system will be able to determine if there is more potential for savings based on the real-time efficiency monitoring, and these identified savings can then be realized by indications given to other systems from the efficiency monitoring system. There may be areas where the existing communication does not adequately capture the anticipated operation of the flight. In this instance there is the potential that efficiencies are missed. For example, in the event that an aircraft performs a "direct to" maneuver during a message gap, that maneuver will be missed by the system that receives the messages from that aircraft and the associated savings will go unrealized. This may be acceptable in certain circumstances like an oceanic cruise segment, but approaching a top-of-descent, it is not desirable.

The efficiency monitoring system disclosed in detail hereinafter will also make use of the results of more traditional post-flight benefits analysis by applying those results towards improving the accuracy of the real-time efficiency calculations.

Other aspects of the invention are disclosed and claimed below.

BRIEF DESCRIPTION OF THE DRAWINGS

Various embodiments will be hereinafter described with reference to drawings for the purpose of illustrating the foregoing and other aspects of the invention.

FIG. 5 comprises FIGS. 5A and 5B, while FIG. 6 comprises FIGS. 6A and 6B. The output indicated by encircled numeral 1 in FIG. 5B is the same as the input indicated by encircled numeral 1 in FIG. 6A, while the output indicated by encircled numeral 2 in FIG. 6B is the same as the input indicated by encircled numeral 2 in FIG. 5A.

DETAILED DESCRIPTION

The following description refers to various processes that are executed by one or more processors. These processes take the form of software running on one or more computers. It should be appreciated that the each disclosed process can be executed by a respective processor or all processes can be executed by one processor or any variation therebetween.

Figure 1:
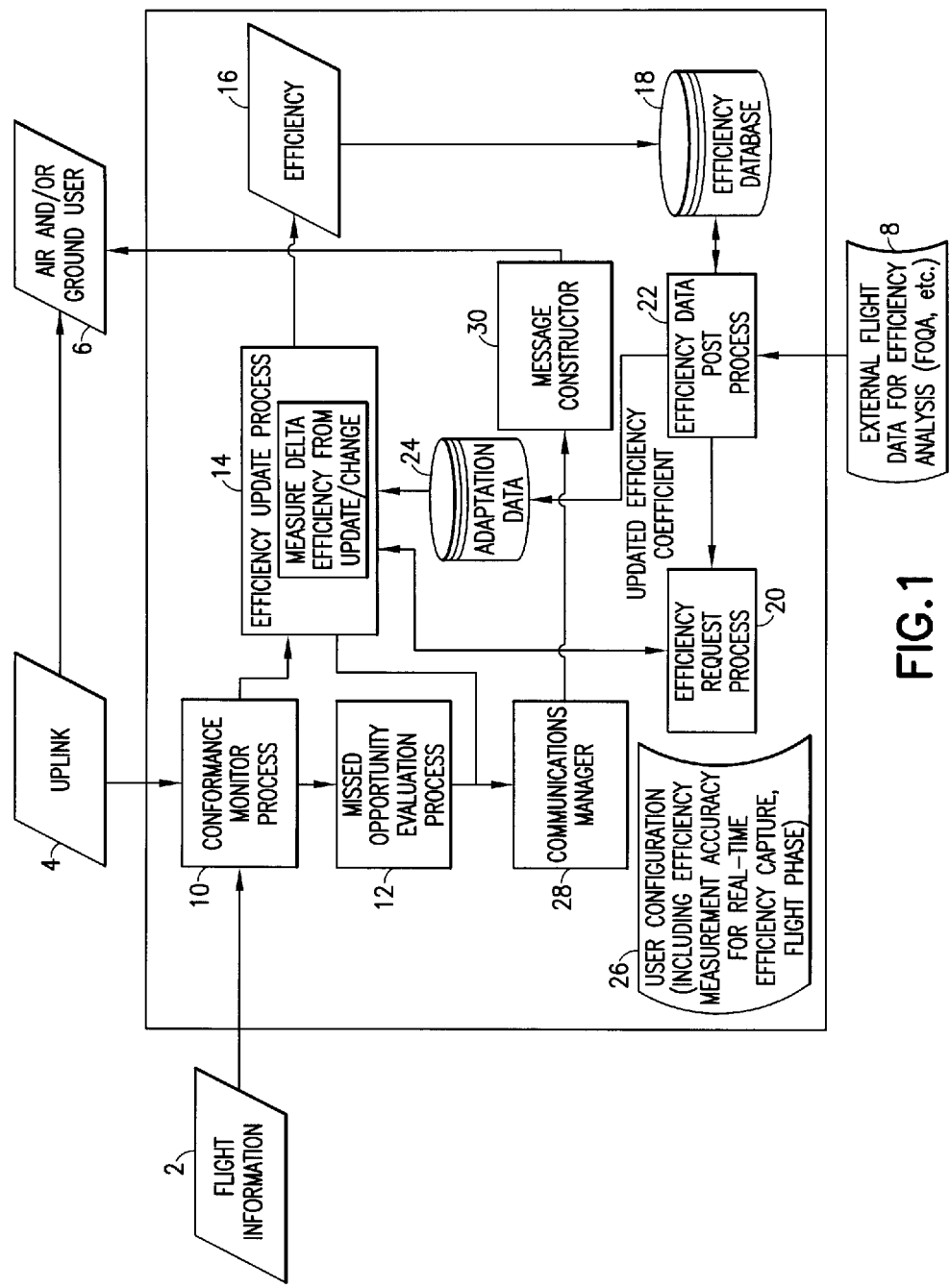
FIG. 1 is a block diagram showing processes executed by an aircraft performance efficiency analysis system in accordance with one embodiment.

At a high level, FIG. 1 shows the operation of an aircraft performance efficiency analysis system in accordance with one embodiment. A multitude of flight information 2 is input into the system. The flight information 2 may include, but is not limited to, aircraft-specific information (e.g., type-specific performance characteristics and parameters, messaging capabilities, software capabilities, etc.), processed flight plan and trajectory information (such as those received from a flight plan processor system, trajectory predictor system, etc.), surveillance data (e.g., radar, ADS-B, ADS-C, etc.), airline preferences/adaptation data, aircraft-generated messages (including airline operational control (AOC), air traffic services (ATS), and other types) and optionally multiple levels of optimum flight profiles for particular aircraft (these will be used for the purpose of comparison with the aircrafts' current trajectories to determine delta efficiencies). Additionally, any uplinks 4 to the aircraft will also form an input so that the system can assess the impacts of the uplinks on the overall efficiency of the flight. As seen in FIG. 1, these uplinks 4 are also sent to air and/or ground users 6. If there were flight profile changes that were the result of voice instructions, these changes would be detected via downlinked or other data (e.g., surveillance data) messaging from the aircraft and potentially trigger the generation of a new value of the MPI, which is used to determine the messaging profile for the aircraft. User configuration data 26 (see FIG. 1) is also entered into the system, which may be adjusted prior to the system start or changed at run-time when the system has started operation. User configuration data can be human input, retrieved from stored data, or dynamically determined by the system based on available data or other selection criteria. Such user configuration data includes, but is not limited to, efficiency measurement accuracy for real-time efficiency capture and flight phase.

In one possible example, an external user 6 selects one or more aircraft of interest that are available for efficiency monitoring, as indicated by the flight information and user configuration data. In another example, the aircraft selection is performed automatically by the system based on rule sets in the user configuration data 26. An additional capability is the manipulation of one aircraft messaging profile for the benefit of one or more other aircraft. This capability may be configured to account for airline differences (e.g., some airlines may not want to incur additional fees to assist another airline), aircraft type differences, etc.

For each specific target aircraft, a conformance monitoring process 10 (see FIG. 1) will determine the value of the initial default MPI from the current aircraft configuration and messaging. Thereafter the conformance monitoring process 10 analyzes the flight information to assess the changes on a specific aircraft's flight. For an initial run, the conformance monitoring process 10 establishes an initial trajectory profile based on projected flight information. The initial trajectory profile preferably includes all specifics about the projected trajectory, including path, times, and information specific to how the aircraft will operate at all those points (e.g., speeds, fuel amounts and weights). The initial trajectory profile data is then outputted to both a missed opportunity evaluation process 12 and an efficiency update process 14. In subsequent runs, the conformance monitoring process 10 establishes an updated trajectory profile, which is a function of newly received real-time flight information, and determines the differences between the updated and initial trajectory profile data. Those differences are also outputted to processes 12 and 14.

Based on the initial trajectory profile received from the conformance monitoring process 10, the missed opportunity evaluation process 12 will establish baseline efficiency values for the aircraft of interest's intended trajectory as well as for other user-defined optimum trajectories. This allows multiple comparisons of the aircraft's current efficiency with a range of efficiencies of other potential trajectories, measuring efficiency parameters for the different cases. For example, the measured efficiency parameters may include one or more of the following items: flight time (per segment, per flight phase, per entire flight, etc.), fuel (initial fuels, predicted fuel levels at specific waypoints and points along the path of flight, fuel to be used for particular phases of flight such as climb and descent, etc.), environmental factors (noise footprints based on engine power, greenhouse gas emissions, etc.), communication costs, overflight fees and other factors. In particular, the missed opportunity evaluation process 12 compares the efficiency of the initial trajectory profile to the efficiencies of user-entered trajectory profiles to try to identify efficiency-gaining opportunities as well as an indication of unrealized efficiencies.

The conformance monitoring process 10 will also give the default MPI value and the initial trajectory profile data to an efficiency update process 14 in the initial run through. The efficiency update process 14 calculates initial baseline values of the efficiency parameters for the flight based on the initial trajectory profile data. The efficiency update process 14 will apply any available historical adaptation data (retrieved from adaptation database 24) to refine the efficiency estimate and output a real-time indication of the current flight information for the configured efficiency parameters. The efficiency block 16 in FIG. 1 represents the efficiency measurements from the efficiency update process 14. The efficiency data 16 may also include real-time or post-flight benefits calculations.

The efficiency data 16 outputted from the efficiency update process 14 will then be stored in an efficiency database 18 or other mechanism for further subsequent post-processing. This real-time data may also be output for viewing by operators, used by other system elements, or otherwise manipulated to give a detailed efficiency view of the aircraft of interest. This is depicted by the efficiency request processor 20 in FIG. 1. The efficiency request process 20 also provides a unique capability to allow an external user or process to select (through a predefined configuration or real-time request) different phases or portions of the flight to see what specific efficiency increases or decreases will be realized from the last messaging input that was received the system. In particular, the efficiency request process 20 can receive a query seeking historical information for a specific flight from the efficiency update process 14, and potentially specific parameters of that flight, in order to provide (to the efficiency update process 14) specific efficiency impacts that were calculated for those portions of the flight.

Other efficiency data, in conjunction with other external flight data 8 for efficiency analysis (e.g., flight operational quality assurance data, acoustic data, etc.), will be processed by an efficiency data post-process 22. The efficiency data post-process 22 enhances the reporting abilities by comparing the true received data from the aircraft with the actual data that were measured and available after the flight and outputting a corrected, post-flight efficiency picture to one or more of the following: the efficiency database 18, efficiency request process 20 and historical adaptation database 24. This data may be used in near-real time if available, and can also be historically processed in order to arrive at updated efficiency coefficients. The efficiency coefficients are corrective values that can be applied for specific conditions that are known to enhance the aircraft data's accuracy. The efficiency coefficients represent a function of historical efficiency calculations (including fuel usages, times, etc.) from previous flights as a function of various external influences that are catalogued for all flights. These influences may include, but are not limited to, geographic considerations, time of year, time of day, other influences that trigger specific known impacts (e.g., wind conditions, temperatures, other meteorological phenomena, etc.), air traffic flows, airport configurations, aircraft types, aircraft configurations, etc. These efficiency coefficients (stored in the adaptation database 24) are then made available to and applied by the efficiency update process 14 in subsequent calculations.

Still referring to FIG. 1, the user configuration data 26 will identify specific types of efficiency parameters to be monitored in real time for each flight. If the user configuration is not available or is not used, all efficiency parameters are to be monitored. Based on this data, as well as other user configuration parameters (such as acceptable communication cost limits to achieve the efficiency monitoring, route-based concerns, etc.), a MPI value will be determined. The value of the MPI can be specified by either the missed opportunity evaluation process 12 or the efficiency update process 14, depending on the specific parameter thresholds that trigger the need to change the value of the MPI.

Although processes 12 and 14 both determine whether the value of the MPI needs to be changed, the two processes are looking at different items and are measuring different efficiency deltas. The efficiency update process 14 is refining the real-time efficiency calculations and looking at delta efficiencies from an efficiency baseline, e.g., by comparing the delta efficiencies to thresholds. Based on these determinations, the efficiency update process 14 may need to change the messaging with the aircraft to get more or less data. The missed opportunity evaluation process 12 is comparing baseline efficiency values for the intended trajectory and for user-entered optimum trajectories to try to identify efficiency-gaining opportunities. The intended trajectory is calculated utilizing such inputs as forecasted events (e.g. holding, volcanic ash, temporary airspace restrictions, weather, etc). If such an opportunity is identified, the user may wish to have updated messaging to more accurately assess whether the benefit of such potential increase in efficiency is worth the cost.

If a change in the messaging profile is desirable, the missed opportunity evaluation process 12 or the efficiency update process 14 will then supply a new MPI value to a communications manager 28. These respective changes in the value of the MPI are independent; the communications manager 28 is responsible for making sure that MPI changes from one process do not interfere with those of the other, or with other messaging already in place with the aircraft.

After receiving a change in the MPI value from either the missed opportunity evaluation process 12 or the efficiency update process 14, the communications manager 28 will manage the creation of the appropriate messaging profile corresponding to that changed MPI value. The resulting messaging profile will identify the types of messages needed within the constraints of the entered configurations, as well as any parameters that the messages will take such as triggering events, desired contents to be returned, etc. Additionally, existing message contracts (i.e., agreements between the aircraft and ground system(s) to provide specific information upon the occurrence of particular events and/or at particular times or time intervals) or configurations that the aircraft of interest is currently using will also be examined to identify whether or not there is overlap between desired efficiency-related messages and those being used by other systems that are also communicating with the aircraft. These overlaps may exist with other external systems that are communicating with the aircraft of interest (for example, a trajectory predictor). If these systems communicate via the communications manager 28, then messaging conflicts will be addressed. If there are overlaps, they will be resolved by fusing the data needs between efficiency messaging and existing messages, ensuring that the efficiency messages will not change the necessary functionality that other systems may need (e.g., the missed opportunity evaluation process or efficiency update process will not change the triggering parameters of an expected message, such as an estimated time-of-arrival change threshold that has been set in the aircraft's airline operations center (AOC) messaging configuration).

The messaging profile index is a major factor in dictating the messaging profiles, and allows a user to specify a desired level of efficiency measurement accuracy. Changes in efficiency measurement may be due to changes to the aircraft's profile, be it from flight crew action, environmental effect, aircraft design or air traffic control intervention. The MPI can be thought of as a scale of accuracy, where more accuracy generally requires additional or different information. More accuracy commonly requires a greater level of messaging in order to provide the updated relevant information to meet the desired MPI. This also generally means an increase in cost. As part of the function of the communications manager 28, a set of dynamic thresholds can be input into the communications manager 28 that will give the next higher and lower messaging requirements for MPI, taking into account key factors such as cost or performance limitations. This means that if a user selects an MPI value of 6 (on a scale of 1 to 10, 1 being lowest accuracy, 10 being highest), the communications manager 28 can show that in order to realize an MPI value of 7, additional messaging is required at a particular cost and make that additional messaging at the additional cost available to the user. Likewise, an MPI value of 5 might result in less messaging or smaller message sizes with a corresponding savings. The user can then decide whether or not the additional messaging (and any changes resulting from it, e.g., increase in cost, increase in bandwidth utilization, etc.) is worth the extra level of efficiency monitoring that would result. The user is also capable of manually initiating such a comparison, and can also specify checking between multiple level differences (e.g., between MPI values of 2 and 7).

Figure 2:
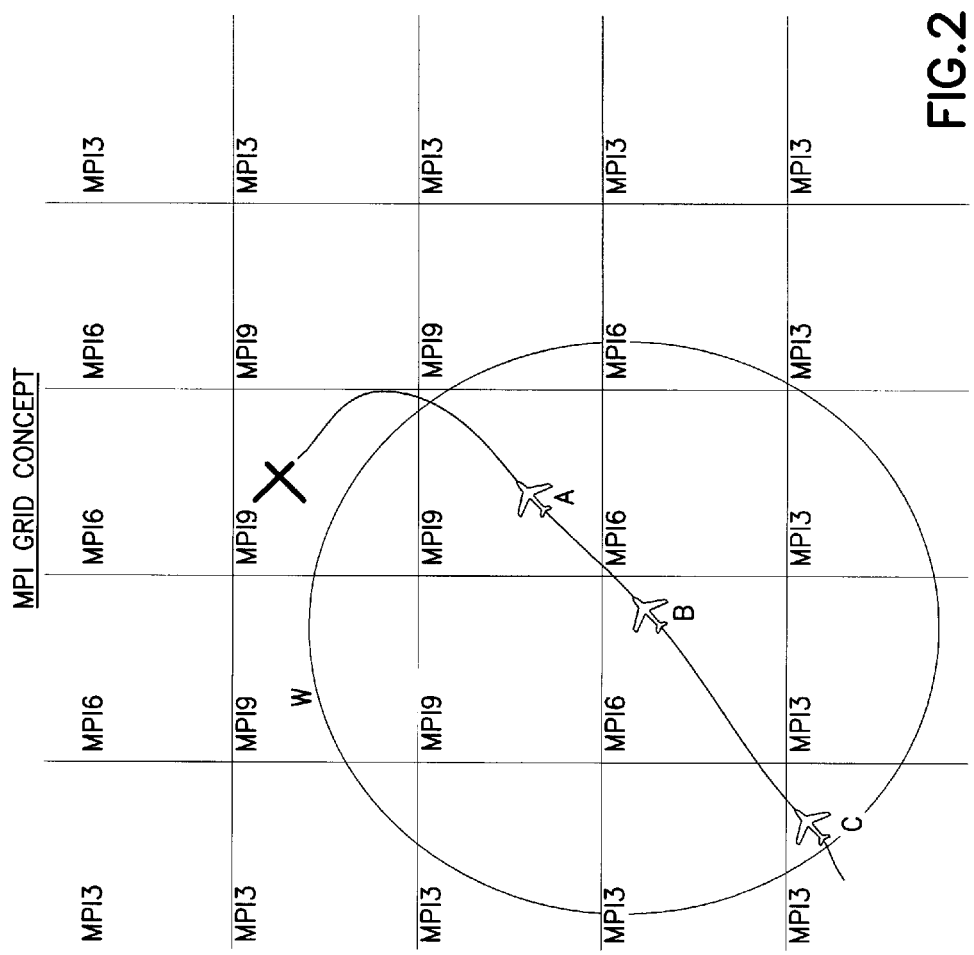
FIG. 2 is a diagram showing the potential assignment of different messaging profile indices in respective sections of a grid representing adjacent polygonal areas and also shows a flight path followed by successive aircraft A, B and C as they approach a particular destination airport.
Figure 3:
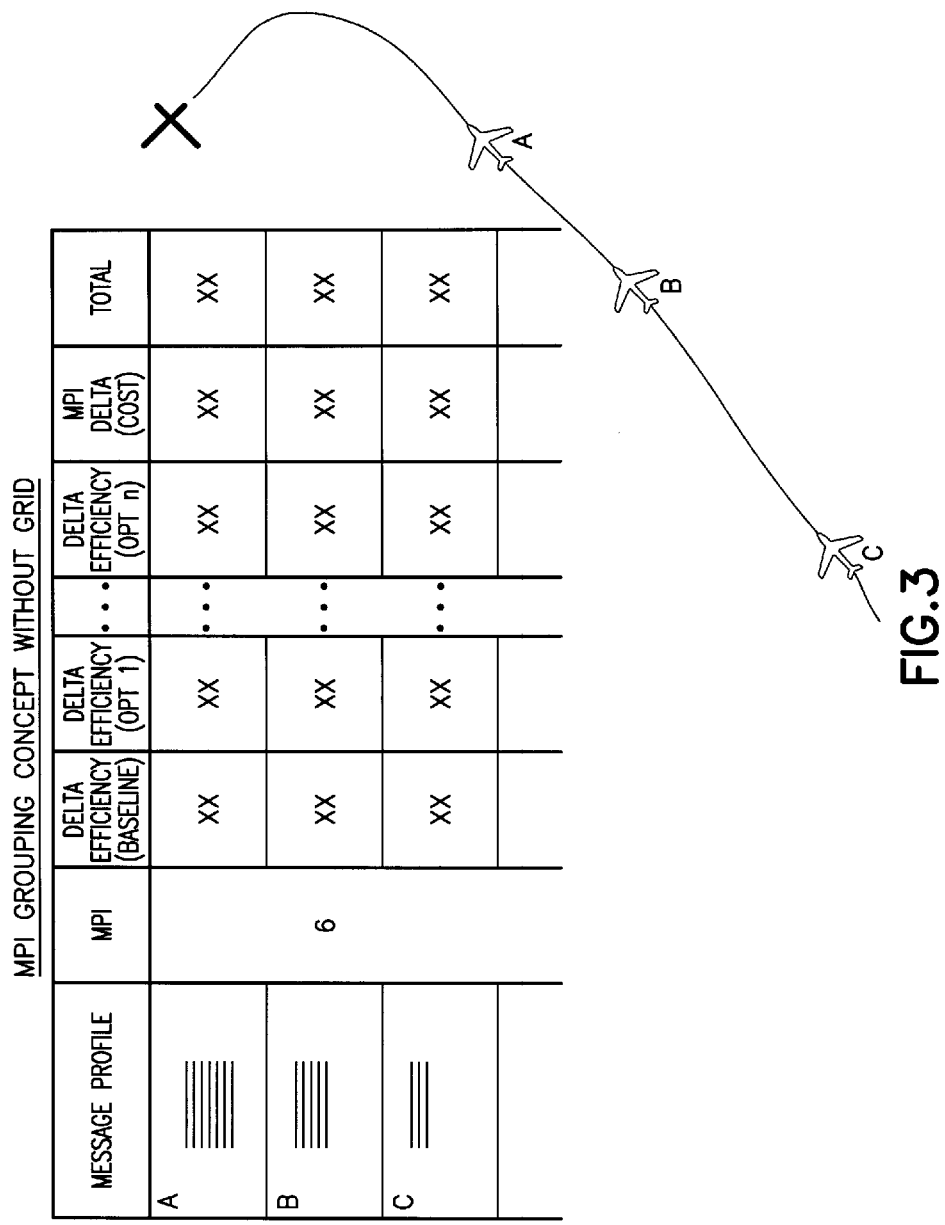
FIG. 3 is a diagram illustrating a messaging profile index grouping concept without a grid, whereby one aircraft with a high messaging profile index can be grouped with other aircraft following the same flight path, thereby enabling more accurate efficiency information about the other aircraft in the group.

Note also that the messaging profile can be applied to individual aircraft or to more than one aircraft in a group(s). These aircraft groups can be defined by potential influences and/or commonality in distance (e.g., from each other or from specific points), time, flight path (including altitude), aircraft type, and other factors. For example, FIG. 2 shows one possible assignment of messaging profile index values to sections of a grid (shown as a grid, although the actual areas of the different MPI sections can be thought of as two- or three-dimensional polygonal areas). For this example, the grid has been defined to give more accurate efficiency information for three aircraft A, B and C as they approach (using the same flight path) a particular destination airport (indicated by a bold-faced cross-shaped symbol in FIG. 2). As the aircraft transit towards the destination airport, their messaging profiles will be updated based on the MPI value for the grid section that aircraft is currently flying over. A user of the system may decide to group aircraft A, B and C. Aircraft A requires specific information in order to meet the MPI value of 9, which includes detailed weather information on the weather system denoted by circle W. Since some of the information (such as the weather data) also applies to aircraft B and C, it can be applied to the overall efficiency assessment of those aircraft, in essence raising the MPI value for each of those aircraft. By grouping the aircraft, the user is, at little or no additional impact, getting more accurate efficiency information about or from other aircraft in the group. Optionally, an aircraft or group of aircraft can also be assigned an MPI value independent of any kind of gridded messaging profile index implementation (e.g., aircraft A, B and C are all assigned an MPI value of 6). This is shown in FIG. 3. For this case, the messaging profile of each of the aircraft is different, but all are able to obtain the benefit of the same MPI value. The fact that some of the messaging may be shared between aircraft (e.g., downlinked meteorological information can apply to all of the aircraft) is also taken into consideration. Note also that FIG. 3 depicts a case where multiple optimum trajectories (designated OPT 1 through OPT n in FIG. 3) are displayed, showing the delta efficiencies that would be possible if those trajectories could be realized by the aircraft.

Referring again to FIG. 1, once normalized by the communications manager 28, the messaging profile will be given to a message constructor 30, which creates the necessary messages. These messages will be in the proper format for the specific aircraft type, taking into account the aircraft capabilities, equipage and software loads. The messages may be a combination of AOC and ATS message types, and may require repetitive sending in order to receive the necessary data as dictated by the message efficiency profile. Additionally, the message constructor 30 will handle any protocol necessary in order to subsequently handle the messaging (e.g., for a particular type of messaging contract that will periodically require uplinks with additional information).

Upon receipt of updated information, either downlinked directly from the aircraft or observed on-board the aircraft (i.e., flight information 2 in FIG. 1), or upon receipt of uplinked information 4 (such as an environmental information or wind update), the conformance monitor process 10 will analyze the information to assess any differences in the details (including path, times, weights, fuel projections, etc.) of the baseline trajectory profile and an updated trajectory profile. If the differences are sufficiently great, those differences will be passed to the missed opportunity evaluation process 12 in order to determine if any of the user-set efficiency thresholds have been exceeded. These thresholds represent a limit of the delta efficiency for specific parameters, as identified by the user, such as those mentioned previously (e.g., flight time (per segment, per flight phase, per entire flight, etc.), fuel (initial fuels, predicted fuel levels at specific waypoints and points along the path of flight, fuel to be used for particular phases of flight such as climb and descent, etc.), environmental factors (noise footprints based on engine power, greenhouse gas emissions, etc.), communication costs, overflight fees, and other factors). Included along with the efficiency delta will be an efficiency data cost delta. Since there is likely a cost associated with an increase in the value of the MPI, the overall cost of achieving this messaging/information gathering will also be quantified. The missed opportunity evaluation process 12 will analyze the differences between the efficiencies of the updated trajectory profile and the efficiencies of the user-inputted optimum trajectory profiles, and determine if there could be additional efficiencies to be gained. If there are other opportunities, these can be indicated to a user in order for the user to make a determination whether additional instructions should be given to the aircraft in order to capture those efficiencies. Finally, a total realized efficiency can optionally be calculated, which represents the difference between the efficiency delta and the data collection cost to give a total estimated efficiency. Total estimated efficiency refers to the efficiency of the parameters having to do with the flight itself, i.e., the differences in time, track miles, fuel, crew costs, etc. Total realized efficiency also takes into consideration such additions as communication costs, costs which would not have been incurred had there not been efficiency monitoring in place. Units of efficiency can be dollars, time, fuel, track miles, etc. The user determines which of these efficiency categories are of value. It may be all, multiple or one.

If the efficiency thresholds have been exceeded for one or more requirements, a new efficiency baseline will be set. If the change requires a modification to the efficiency messaging profiles, an indication (i.e., the MPI value) is given to the communications manager 28 to configure a new messaging profile based on the latest information. Note that although an efficiency threshold has been exceeded, the messaging solution (i.e., profile) may not change depending on the details of the efficiency delta and user configuration.

The conformance monitoring process 10 will also send the differences (compared to the baseline trajectory profile data) of the updated trajectory profile data from the aircraft or other source to the efficiency update process 14, which will calculate the efficiency deltas so that real-time efficiency information can be updated. Additionally, any updated efficiency coefficients generated by the efficiency data post-process 22 will also be applied to refine the efficiency information. This is then relayed to the efficiency request processor 20, allowing any external users to clearly see the effects of changes in the efficiency that are due to uplinked messages or changes in the way the aircraft is being flown, with whatever level of detail and whichever combinations are desired (e.g., per flight segment, per total flight, etc.). If any of the efficiency deltas also exceed an efficiency threshold that is set by the user at the efficiency update process 14, then a further determination is made whether or not a new MPI value is needed. If a new value is needed, the efficiency update process will calculate the new MPI value and output that information to the communications manager 28 for generating a new messaging profile to be set with the aircraft.

Figure 4:
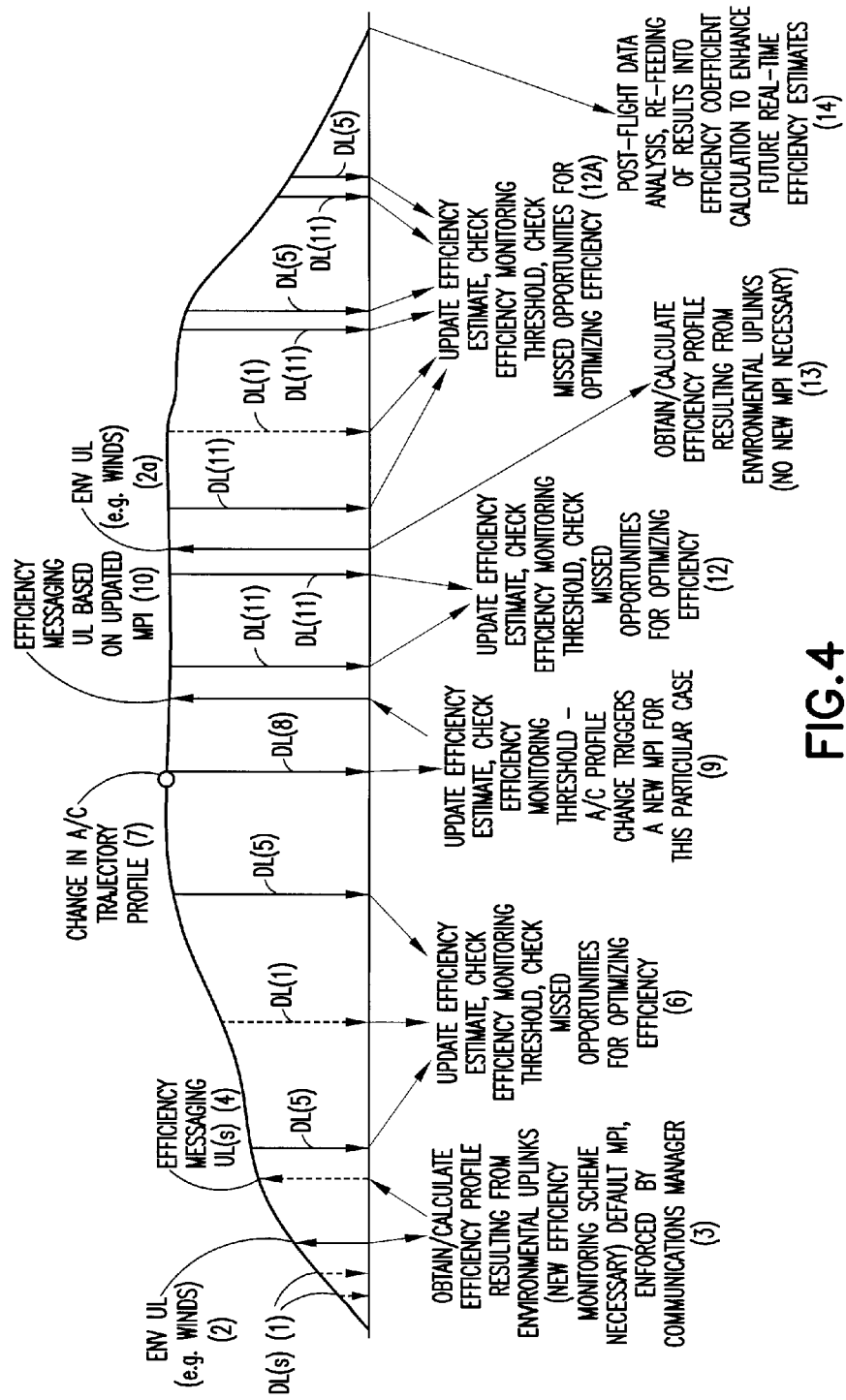
FIG. 4 is a diagram showing a messaging profile of a nominal flight for illustration purposes of how the system depicted in FIG. 1 would work and interact with various events in one potential exemplary case.

A messaging profile of a nominal flight is shown in FIG. 4 to illustrate how the system works and responds to various events. This example is one potential case; many more scenarios are possible depending on the details of the flight. Prior to being identified for efficiency monitoring, an aircraft may have an existing messaging profile. These messages could be due to other services running, an airline's specific configuration of its AOC messaging, or other reasons, and may consist of one or more messages. These pre-existing triggered messages are indicated by the dotted lines in the FIG. 4 which are labeled "DL(1)". (In FIG. 4, "DL" stands for downlink; "UL" stands for uplink; "A/C" stands for aircraft; and "ENV" stands for environmental.) The efficiency monitoring system will use these pre-existing messages in the process of establishing a baseline. For this particular flight, an environmental uplink (labeled "ENV UL (2)" in FIG. 4) is sent to the aircraft by another external system. In this example, the uplink "ENV UL (2)" consists of updated wind information. The uplink is also given to the efficiency monitoring system in order to assess the efficiency impacts on the trajectory and identify any missed efficiency opportunities. This is indicated in FIG. 4 by label "(3)" below the horizontal axis of the graph. Note that based on the information provided from the trajectory along with the user configuration data, a new MPI value is determined to be appropriate. This results in the calculation of a new messaging profile, which is normalized along with any existing messaging profiles in force with the aircraft. The resulting new profile is then uplinked to the aircraft in order to accommodate the required MPI value. This is indicated in FIG. 4 by the label "EFFICIENCY MESSAGING UL(s)(4)". New messages from the aircraft resulting from the updated profile are shown by the four downward arrows labeled "DL (5)" in FIG. 4. All downlinks are analyzed by the efficiency system in order to determine if there are profile changes that result in either the need for a change in the value of the messaging profile index or missed efficiency opportunities. If none of the triggering thresholds are exceeded, no action by the system is necessary except updating the real-time efficiency information and costing information. This is the case as indicated in FIG. 4 by label "(6)" below the horizontal axis of the graph. In this example, multiple downlinks DL(5) both result in no necessary changes to the messaging profile index value.

Still referring to the exemplary messaging profile depicted in FIG. 4, during the course of the flight, an event occurs that results in a change of the aircraft's current and intended trajectory. This event is indicated by a small circle and the associated label "CHANGE IN A/C TRAJECTORY PROFILE (7)" in FIG. 4. Such an event could occur for a multitude of reasons as previously described (e.g., ATC intervention, weather changes, etc.). The change in trajectory profile triggers a new downlink with relevant information related to the change, which is indicated in FIG. 4 by the label "DL(8)". This downlink is analyzed, but in this case the change in trajectory results in the need for an updated MPI as indicated by label "(9)" in FIG. 4. The updated MPI for this case means that a new messaging profile "with" the aircraft is needed, and an additional uplink(s) labeled "EFFICIENCY MESSAGING UL BASED ON UPDATED MPI (10)" necessary in order meet the new MPI value. The resulting downlinks, labeled "DL(11)" in FIG. 4, supplement the existing messaging profile and are analyzed by the system as they are received. If no other changes to the value of the MPI are necessary upon analysis of the downlinks, indicated by labels "(12)" and "(12*a*)" in FIG. 4, then no additional messaging profiles are needed. This also includes uplinks; for example, if a new environment uplink (labeled "ENV UL (2*a*)" in FIG. 4) is sent, that uplink's impact is also analyzed, as indicated by label "(13)" in FIG. 4. If there are no changes to the trajectory that exceed the allowable thresholds as configured by the user, then a new MPI value is not necessary, and the messaging profile with the aircraft remains as it was. Finally, upon completion of the flight, a post-flight analysis of flight data is performed, as indicated by label "(14)" in FIG. 4. This data may include quality assurance data such as FOQA or QAR data from the aircraft as well as various air- and ground-originated data from various sources. The efficiency results will be compared with the real-time results that were produced during the flight. If there are discrepancies, the post-flight data will be further analyzed in order to determine one or more sets of efficiency coefficients, which can be applied to the real-time efficiency calculations in order to make the calculations more accurate.

A messaging profile is generally set by the ground system, and depending on the types of messages chosen, may require periodic queries or updates from the ground system to interrogate the aircraft. If a change in the value of the MPI is required, this will likely require some action by the ground system to dynamically change the aircraft's messaging. This explains the earlier statement that the message profile is established "with" the aircraft.

Furthermore, in the example depicted in FIG. 4, more messaging was required in order to analyze the efficiency to a higher level of accuracy. Those new messages are required in addition to the messages of the original messaging profile, so the latter is added to message-wise.

For the purpose of illustration, a sequence of operations performed by a system in accordance with one embodiment will be described with reference to the flowchart shown in FIGS. 5 (including FIGS. 5A and 5B) and 6 (including FIGS. 6A and 6B). However, it should be appreciated that the operations shown in that flowchart could be varied or performed in a different order without departing from the scope of the teaching herein. In addition, although various operations are depicted in FIGS. 5 and 6 as being performed in sequence, it should be understood that the processes depicted in FIG. 1 are running concurrently.

Figures 5, 5A, 5B:
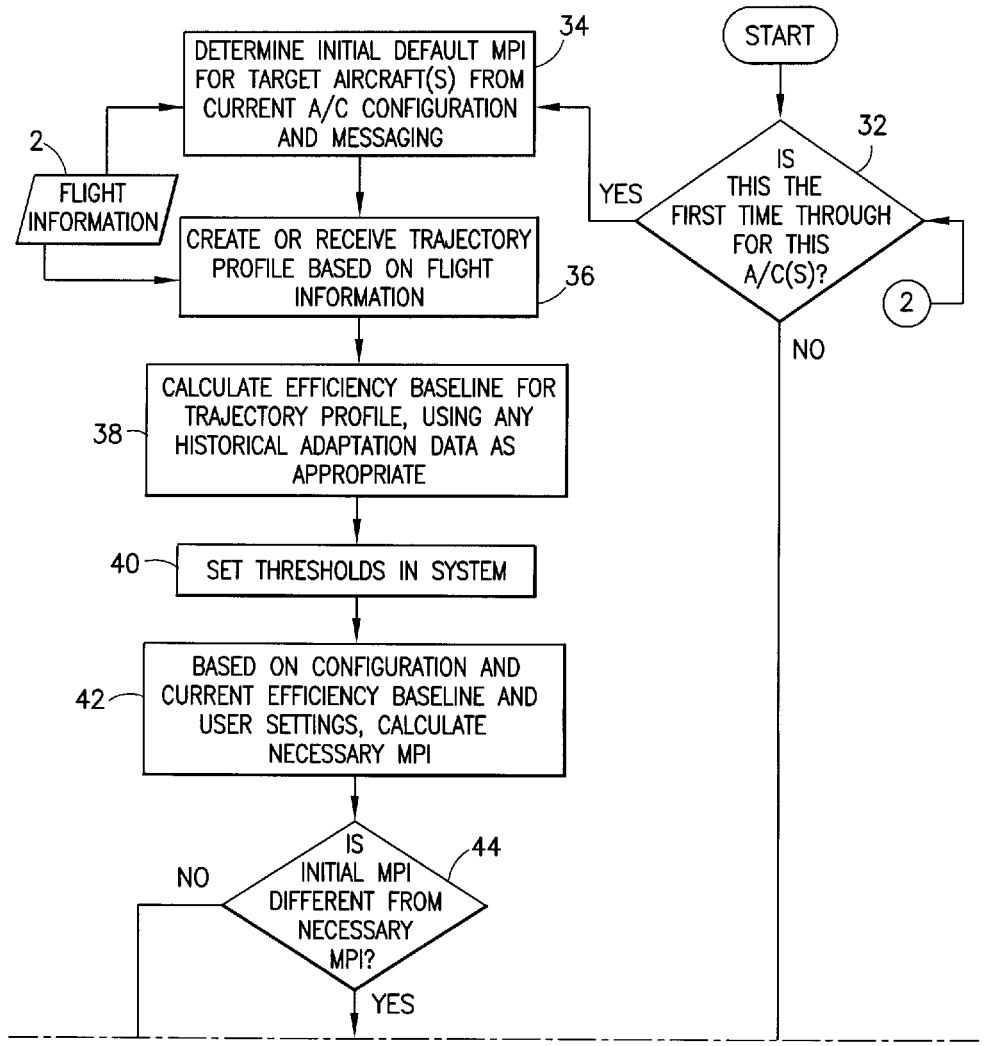
FIGS. 5 and 6 are parts of a flowchart showing various operations performed by the processes depicted in FIG. 1.
Figure 5B:
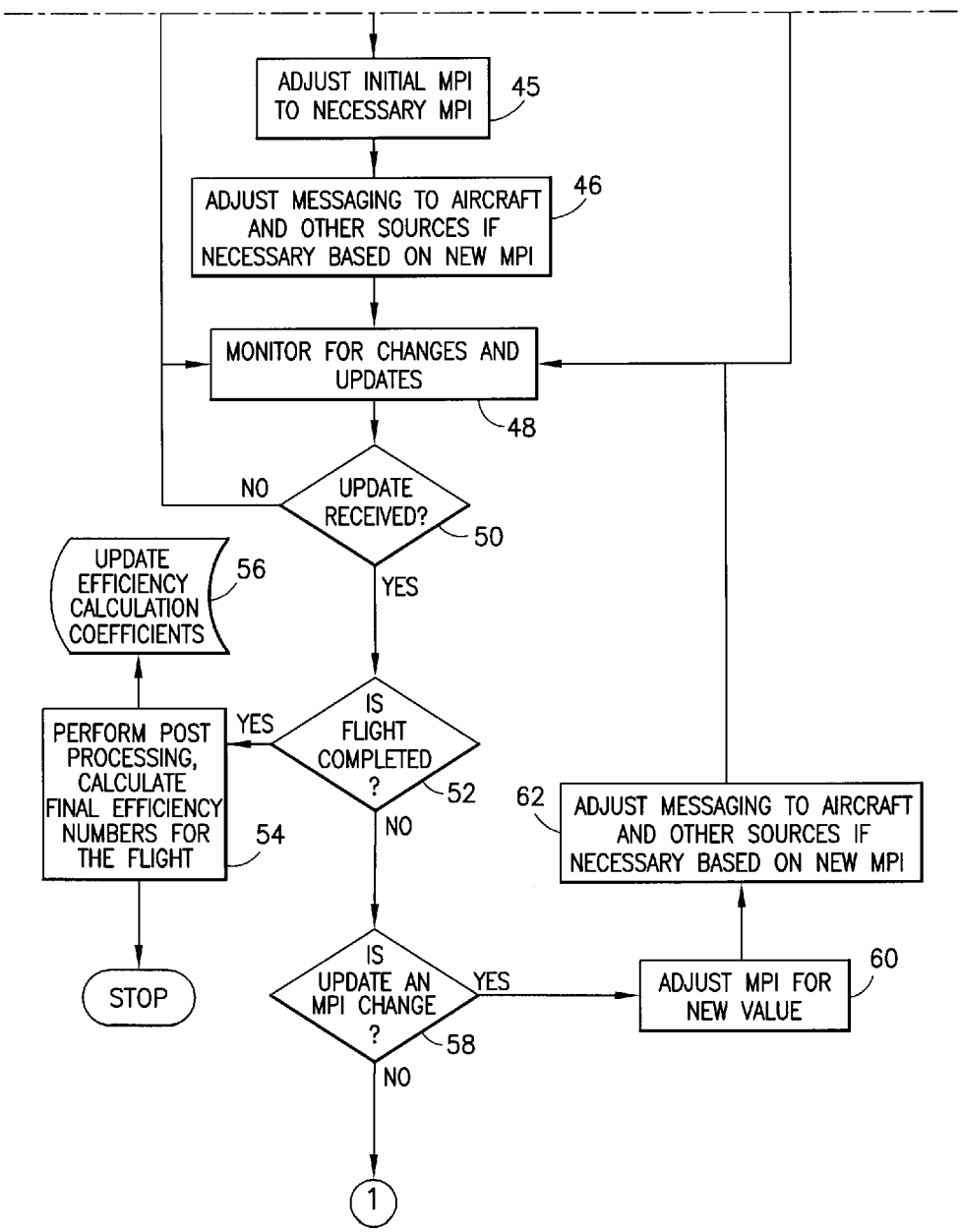
Figure 6B:
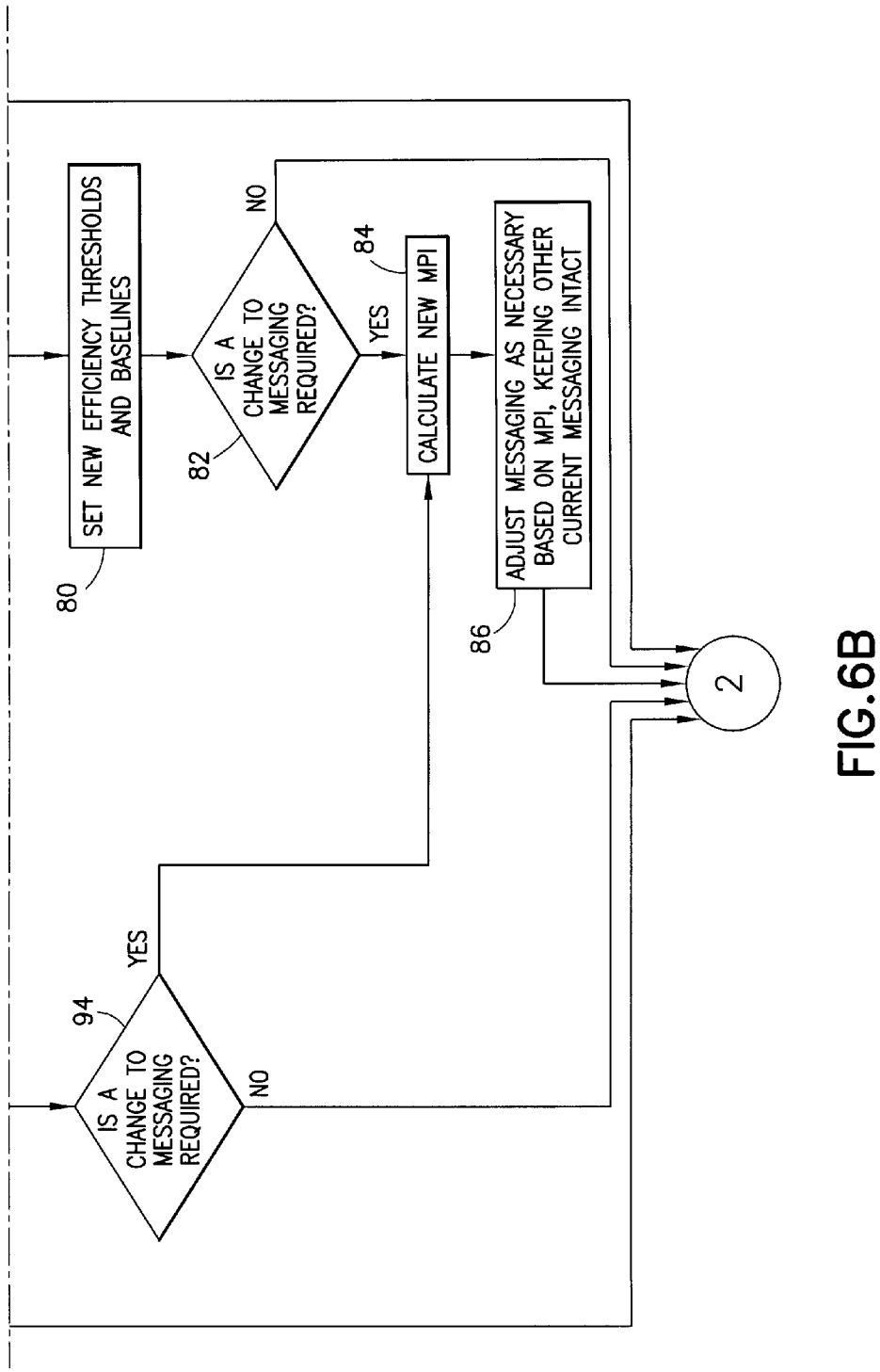

Referring first to FIG. 5A, the system determines whether the efficiency monitoring for the target aircraft has already been initialized (decision block 32). If the current run is the first (i.e., the "YES" output from decision block 32), then the conformance monitoring process (block 10 in FIG. 1) initializes the system for the target aircraft by determining the initial default MPI value based on the current aircraft configuration and messaging (operation 34). [The system response if the current run is not the first (i.e., the "NO" output from decision block 32 in FIG. 5A) will be described later with reference to FIG. 5B.] The conformance monitoring process also creates or receives an initial trajectory profile based on flight information 2 (operation 36 in FIG. 5A). That initial trajectory profile is outputted to the efficiency update process (block 14 in FIG. 1). The efficiency update process then calculates an efficiency baseline for that initial trajectory profile (operation 38 in FIG. 5A), using any historical adaptation data as appropriate (e.g., if required current data is missing for any reason). In addition, the delta efficiency thresholds to be used by the efficiency update process are set (operation 40 in FIG. 5A) based on user-inputted information in the user configuration for the target aircraft. Based on the configuration and current efficiency baseline and user settings, the efficiency update process calculates a necessary value of the MPI (operation 42) and determines whether the initial MPI value and the necessary MPI value are different (decision block 44 in FIG. 5A). If the initial and necessary MPI values are different (i.e., the "YES" output from decision block 44 in FIG. 5A), then the necessary MPI value is sent to the communications manager (block 28 in FIG. 1), which adjusts the MPI to the necessary value and then manages the creation of the appropriate messaging profile corresponding to the necessary MPI value (operation 45 in FIG. 5B). Once normalized by the communications manager, the messaging profile will be given to the message constructor (block 30 in FIG. 1), which adjusts the messaging to aircraft and other sources to conform to the new messaging profile (operation 46 in FIG. 5B). Thereafter the monitoring process will monitor the incoming flight information and uplink messages for changes and updates (operation 48 shown in FIG. 5B).

Alternatively, if the initial and necessary MPI values are not different (i.e., the "NO" output from decision block 44 in FIG. 5A), then the monitoring process will monitor the incoming flight information and uplink messages without any adjustment to the initial MPI value by the communications manager.

In either case, as part of the monitoring process (operation 48 in FIG. 5B), a determination is made whether an "update" has been received (decision block 50 in FIG. 5B). The term "update" comprises, for example, downlinks, uplinks, configuration changes, new flight information, etc. If an update has been received (i.e., the "YES" output from decision block 50 in FIG. 5B), then the efficiency update process determines whether the update indicates that the flight has been completed (decision block 52 in FIG. 5B). In the absence of an update (i.e., the "NO" output from decision block 50 in FIG. 5B), the monitoring process will continue to monitor the incoming flight information and uplink messages for changes and updates (operation 50 shown in FIG. 5B).

If the information in the update indicates that the flight has not been completed (i.e., the "NO" output from decision block 52 in FIG. 5B), then the efficiency update process determines whether the update is a change in the MPI value (e.g., from a new user configuration) (decision block 58 in FIG. 5B). If the update is a change in the MPI value (i.e., the "YES" output from decision block 58 in FIG. 5B), then the new MPI value is sent to the communications manager, which adjusts the MPI to the new value and then manages the creation of the appropriate messaging profile corresponding to the new MPI value (operation 60 in FIG. 5B). The messaging profile will be given to the message constructor (block 30 in FIG. 1), which adjusts the messaging to aircraft and other sources to conform to the new messaging profile (operation 62 in FIG. 5B). Thereafter the monitoring process will continue to monitor the incoming flight information and uplink messages for changes and updates (operation 48 shown in FIG. 5B).

Alternatively, if the information in the update indicates that the flight has been completed (i.e., the "YES" output from decision block 52 in FIG. 5B), then the efficiency data post-process (block 22 in FIG. 1) performs the post-processing operations previously described, including calculation of the final values for all efficiency parameters for the completed flight (operation 54 in FIG. 5B) and the generation of updated efficiency calculation coefficients (data block 56 in FIG. 5B), which are stored in a database (i.e., adaptation database 24 in FIG. 1) for later use by the efficiency update process.

If the update received is not a change in the MPI value (i.e., the "NO" output from decision block 58 in FIG. 5B), then the conformance monitoring process (block 10 in FIG. 1) updates the target aircraft's trajectory profile or status based on the latest information (operation 70 in FIG. 6A) and outputs the trajectory profile deltas (i.e., differences between the baseline and updated trajectory profiles) to the efficiency update process and to the missed opportunity evaluation (blocks 12 and 14 in FIG. 1). Then the efficiency update process and the missed opportunity evaluation process each calculate new efficiency values (i.e., updated efficiency estimates) for respective sets of parameters based on the latest trajectory or status update (operation 72 in FIG. 6A), which parameter sets may be different.

The efficiency update process then determines the difference between the updated efficiency estimates and previous (i.e., baseline) efficiency estimates for the efficiency parameters that it monitors and compares those efficiency deltas to respective thresholds (operation 74 in FIG. 6A). Those efficiency estimates and details (data block 76 in FIG. 6A) are outputted by the efficiency update process for immediate or future use by users. A determination is then made whether any of the thresholds have been exceeded for parameters of interest (decision block 78 in FIG. 6A). If the efficiency thresholds have been exceeded for one or more requirements (i.e., the "YES" output from decision block 78 in FIG. 6A), new efficiency thresholds and baselines will be set (operation 80 in FIG. 6B) and, optionally (depending on settings in the user configuration), a notify user function 92 may be activated to give an indication to an operator and/or notify other systems to take action (e.g., request a new route from ATC, refine missed opportunity inputs, etc.). For example, in response to activation of the notify user function, an appropriate message may be displayed in the form of a pop-up window on a computer monitor or a display screen of a hand-held device.

After the new efficiency thresholds and baselines have been set, the efficiency update process then determines (depending on the details of the efficiency delta and user configuration) whether the current efficiency messaging profile needs to be changed (decision block 82 in FIG. 6B). If a messaging change is required (i.e., the "YES" output from decision block 82 in FIG. 6B), then the efficiency update process calculates a new MPI value and outputs that value to the communications manager (operation 84 in FIG. 6B). Then the communications manager again manages the creation of the appropriate messaging profile corresponding to the new MPI value. The messaging profile will be given to the message constructor, which adjusts the messaging to aircraft and other sources to conform to the new messaging profile, keeping other current messaging intact (operation 86 in FIG. 6B). The process then returns to decision block 32 shown in FIG. 5A. If the monitoring process has already been initialized as previously described (i.e., the "NO" output from decision block 32 in FIG. 5A), then the monitoring process will continue to monitor the incoming flight information and uplink messages for changes and updates (operation 48 shown in FIG. 5B).

The process will also return to decision block 32 shown in FIG. 5A if no thresholds have been exceeded (i.e., the "NO" output from decision block 78 in FIG. 6A) or if one or more thresholds have been exceeded but a messaging change is not required (i.e., the "NO" output from decision block 82 in FIG. 6B).

Returning to FIG. 6A, after the missed opportunity evaluation process has calculated new efficiency values (i.e., updated efficiency estimates) for a set of parameters of interest based on the latest trajectory or status update (operation 72 in FIG. 6A), the missed opportunity evaluation process then checks for missed opportunities for optimizing efficiency based on the new efficiency profile (operation 88 in FIG. 6A). In particular, the missed opportunity evaluation process compares efficiency values based on the current trajectory profile to efficiency values that might be achievable were the aircraft of interest to fly with a user-inputted optimum trajectory profile, thereby deriving one or more efficiency deltas. A determination is then made (i.e., by comparing each efficiency delta to a respective threshold) whether any opportunities to improve efficiency have been missed (decision block 90 in FIG. 6A). If an opportunity has been missed (i.e., the "YES" output from decision block 90 in FIG. 6A), then the missed opportunity evaluation process determines (depending on the details of the efficiency delta and user configuration) whether the current efficiency messaging profile needs to be changed (decision block 94 in FIG. 6B) and, optionally (depending on settings in the user configuration), the notify user function 92 may be activated to give an indication to an operator and/or notify other systems to take action.

If a messaging change is required (i.e., the "YES" output from decision block 94 in FIG. 6B), then the missed opportunity evaluation process calculates a new MPI value and outputs that value to the communications manager (operation 84 in FIG. 6B). Then the communications manager again manages the creation of the appropriate messaging profile corresponding to the new MPI value. The messaging profile will be given to the message constructor, which adjusts the messaging to aircraft and other sources to conform to the new messaging profile, keeping other current messaging intact (operation 86 in FIG. 6B). The process then returns to decision block 32 shown in FIG. 5A, as previously described.

The process will also return to decision block 32 shown in FIG. 5A if a determination is made that no opportunities have been missed (i.e., the "NO" output from decision block 90 in FIG. 6A) or if an opportunity has been missed but a messaging change is not required (i.e., the "NO" output from decision block 94 in FIG. 6B).

As disclosed above, both the missed opportunity evaluation process and the efficiency update process determine when thresholds are exceeded. The efficiency update process 14 (see FIG. 1) determines when thresholds for the differences between the respective efficiencies of current (i.e., updated) and baseline (e.g., initial) trajectory profiles have been exceeded. If they have been exceeded, a new MPI value may be needed (e.g., if the new trajectory information indicates that the aircraft is in a holding pattern, it would have a much lower efficiency than if it was flying to its destination, so a new lower MPI value, indicating less information about the aircraft is necessary, may be sent). The missed opportunity evaluation process detects differences between the respective efficiencies of the current trajectory profile and user-inputted optimal trajectory profiles (e.g., the aircraft is flying closer than expected to an efficient route, given the most up-to-date wind information; this means the aircraft may be achieving a higher level of efficiency, but in order to know for sure the MPI value needs to be increased to get a higher level of fidelity of information about the aircraft). The need for a change in the MPI value is determined by the level of accuracy required to measure the efficiencies as well as which parameters are selected, which information is included in the user configuration database.

MPI Calculations

The efficiency calculations are performed over a number of parameters that are selectable by a user or selected automatically by the system based on the parameters available (e.g., some parameters may not be available due to the current information from the aircraft). These may include, but are not limited to, current or predicted values of the following: fuel, time, distance, emission, range, aircraft weight, cost index, airspace restrictions, aircraft limitations, airline-specific limitations and true air speed.

Additionally, the user has input into the accuracy level desired for the overall efficiency measurement. This user input may be based on retrieved stored configuration data, calculated automatically by the system in order to meet a preference such as minimal cost, or calculated automatically based on available data. If this is the first run through of the system, the current (initial) MPI is calculated from the initial selected parameters and the efficiency baseline for those values.

Initial MPI calculation is performed by cycling through the initial efficiency baseline values at different points in the aircraft trajectory, using historical data and/or reading aircraft configuration settings to determine values of related parameters. These parameters all interrelate to each other, as changes to one parameter affect the values of the others. Depending on the parameters chosen by the user, algorithms are applied which use input or current values to determine the interrelationships. Each of the parameters may be expressed as a function of at least one other parameter. Determining the value of one based on a particular input serves as an input to another parameter, and thus affects that value.

These interrelationships may be iterated over a number of times, performing calculation runs to smooth the values. The interrelationships are then adapted to a normalized scale and the initial MPI is determined from where on the scale the combined output of the parameters end up on the MPI scale. This is illustrated pictorially in FIG. 7.

Figure 7:
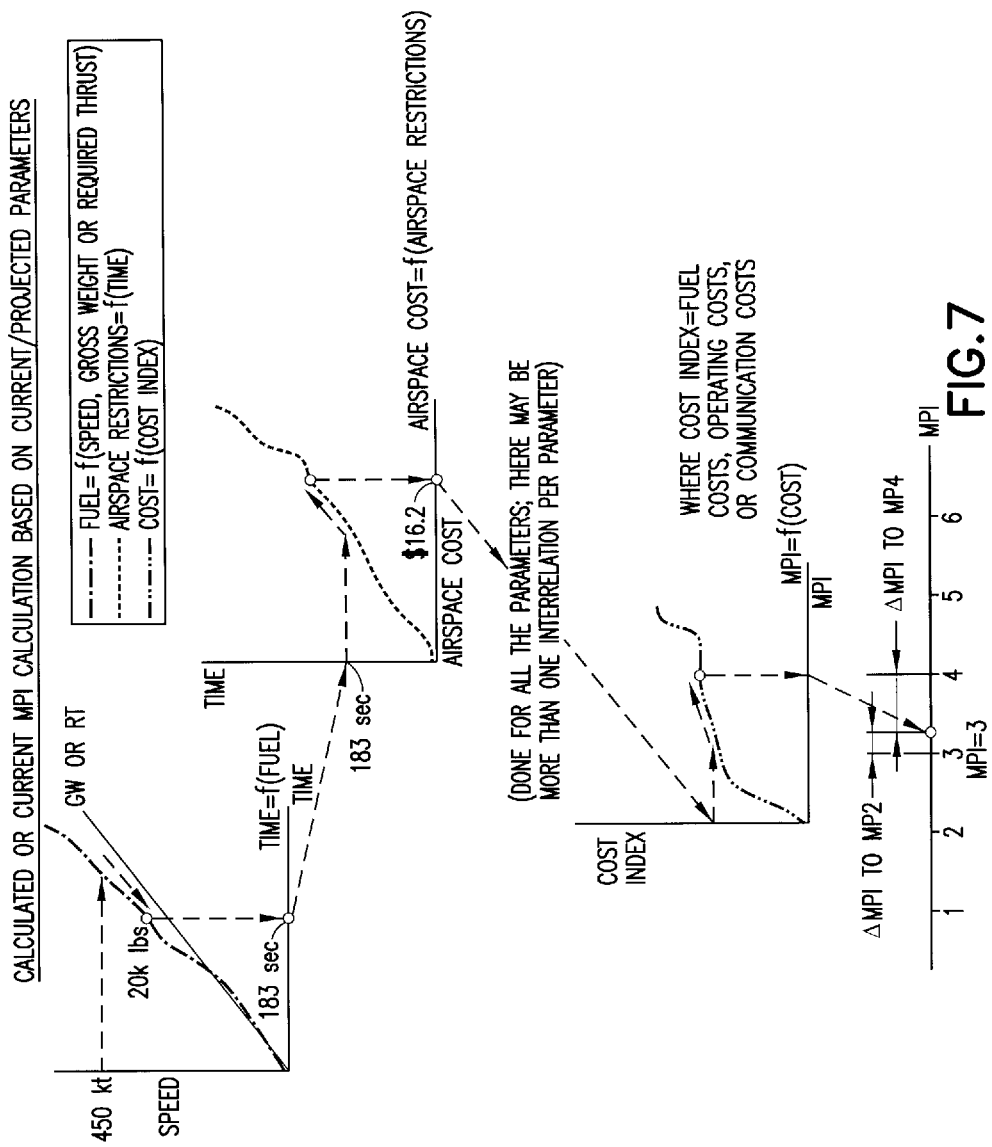
FIG. 7 is a diagram showing a process for calculating a messaging profile index based on current or projected values of selected efficiency parameters in one potential exemplary case.

In FIG. 7, the measured value of true air speed of 450 kts is input into the system. Fuel can be expressed as a function of speed, gross weight or required thrust (for example), and that value is then calculated. The graphs themselves are not linear, since they represent multi-dimensional functions as opposed to a two-dimensional graph. The fuel, when calculated, is then put into the airspace restrictions as a function of time in order to determine that value. The time then serves as an input into airspace costs, which subsequently serves as an input to cost index. These types of calculations will be iterated over all the parameters, and there may be multiple iterations for each parameter depending on the number of interrelationships that exist between the parameters. Those interrelationships are dependent on the parameters chosen and the proprietary algorithms that define the dependency of one parameter on another. Note also that some of these graphs are shown in a two axis format, whereas the first graph (speed/required thrust/time) is a three-dimensional representation; in practice, these may be multi-dimensional overlay vectors that are not easily depicted in diagrams.

As illustrated in FIG. 7, there are multiple dependencies on the parameters selected. Note also this diagram gives an indication of the potential for a delta MPI (the change necessary to drop to a lower MPI, e.g. from 3 to 2, or rise to a higher MPI, e.g., from 3 to 4).

When new information for an aircraft is received from any source, a new calculation is performed. The MPI can be determined using the updated information. Any change that may result in an MPI change will be identified to the user, and the user and/or system will decide the appropriate action to take (i.e., whether or not to change the MPI). If the user elects not to change the MPI, the user will either be getting more information than is necessary to achieve the level of efficiency monitoring that is desired, or will not have enough information to accurately determine the efficiency (depending on whether the new calculated MPI is lower or higher). In regular circumstances, this case would only occur if there was some new event (such as the sudden appearance of additional, unsolicited data for the aircraft or the unexpected absence of data in the case of an equipment failure or some other condition that would inhibit anticipated information flow).

The MPI can also be manually overridden by a user. A user is defined as something which controls input into the system. A user can be a human, a software process that works off of a predefined or dynamic configuration, a software process that acts upon multiple calculations and algorithms based on input data, or some other aspect of control. When an MPI is selected, it will be forced to the selected value regardless of the calculated MPI. This will give the user a desired efficiency accuracy measurement on a number of parameters, and the MPI selection will ultimately affect the messaging between the aircraft and the ground (in the previous example, the MPI was calculated based on what was currently available). In order to assist the user to make these determinations, the system will determine different minimal accuracy levels that can be achieved by a combination of the information available and the inherent processing capabilities of support functions (such as a trajectory predictor) that will ultimately determine the MPI. For each of the parameters selected, a normalized representation of potential achievable accuracies is given. The parameters may also need to be prioritized by the user for the case where measuring one particular parameter to a higher or lower accuracy impacts the measurement of another. This can also occur for the weighting of the costs associated with obtaining the data. Therefore, depending on selections made by the user, the normalized representations of the parameters' accuracies will change dynamically (similar to the way the calculated MPI values change depending on the input values to the various functions changing).

Figure 8:
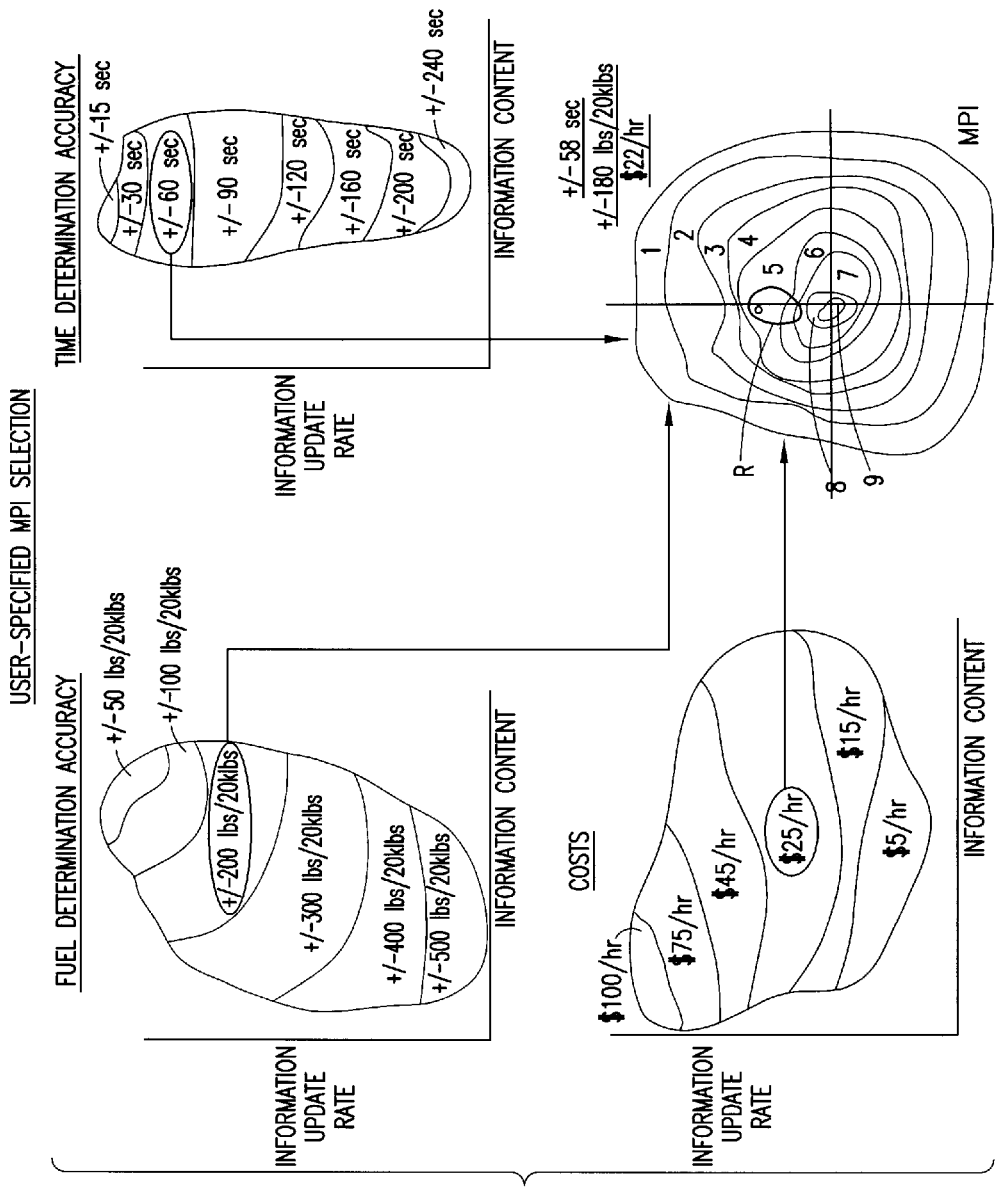
FIG. 8 is a diagram showing a process for selecting desired accuracies for the calculation of efficiency parameters and then determining a value of the message profile index based on the selected accuracies in one potential exemplary case.

The system also determines the best MPI value within the allowable range that satisfies the user's desired needs based on all of the available information assessed. An example of this is shown in FIG. 8. Not all the parameters are shown for this illustrative case. For this instance, one can see the different levels of accuracy available for the different parameters, taking into account the inherent capabilities of the support functions. For illustration purposes, the areas of accuracy are shown as distinct regions. Other sliding scales may also be implemented that will give accuracies on a more granular scale (e.g., instead of ±200 lbs/20 klbs, there might be ±232.4 lbs/20 klbs, depending on where the selection point is; the values are not limited to bounded regions). The units on the axes of the graphs are nominally message frequency on one axis and message content on the other. In general, the more frequent the messaging from all sources, the higher the accuracy that will be achieved. Similarly, the more content that is available in messages (i.e., content relating to specific parameters), the higher level of accuracy can be achieved as well. That helps to frame the graphs and areas for parameter accuracy selection.

FIG. 8 also shows the desired accuracies selected by the user by placing those values inside ellipses. These values will be prioritized according to user input or dynamically determined by the system based on available parameters or other selection criteria, and will be combined across all the parameters to be monitored. The resulting conglomeration of values can be viewed pictorially as a graph on the MPI scale. The MPI scale shown in FIG. 8 has the highest MPI value at the origin. Depending on where the user or the system selections for the individual parameters fall, an MPI range (shown as closed contour R on the MPI graph) will result. Any MPI value within this range will satisfy the desired accuracy requirements. Different selections within the range will result in different levels of measurement accuracy for different parameters. The user or the system can then select a point from this area to get the MPI that will deliver the desired accuracy of measurement. The system proposes a point within the range that best satisfies the user's needs and priorities. This is the desired MPI. In the instance depicted in FIG. 8, the user has selected MPI=5, as shown by the dot inside range R.

Calculating the Real-Time Efficiency

The disclosed system has the ability to determine real-time efficiencies. The real-time efficiency is a measurement of how the aircraft is flying to its intended trajectory across different parameters. This is done using information output by a trajectory predictor for the various parameters to be monitored. The baseline efficiency parameters include trajectory parameters having values provided by the trajectory predictor and derived trajectory parameters (e.g., derived lateral deviation, speed error, etc.) whose values are calculated by the missed opportunity evaluation process and the efficiency update process (i.e., the monitored efficiency parameters may be different for these respective processes). Initially, some of the baseline derived trajectory parameters may be set to zero.

Figure 9:
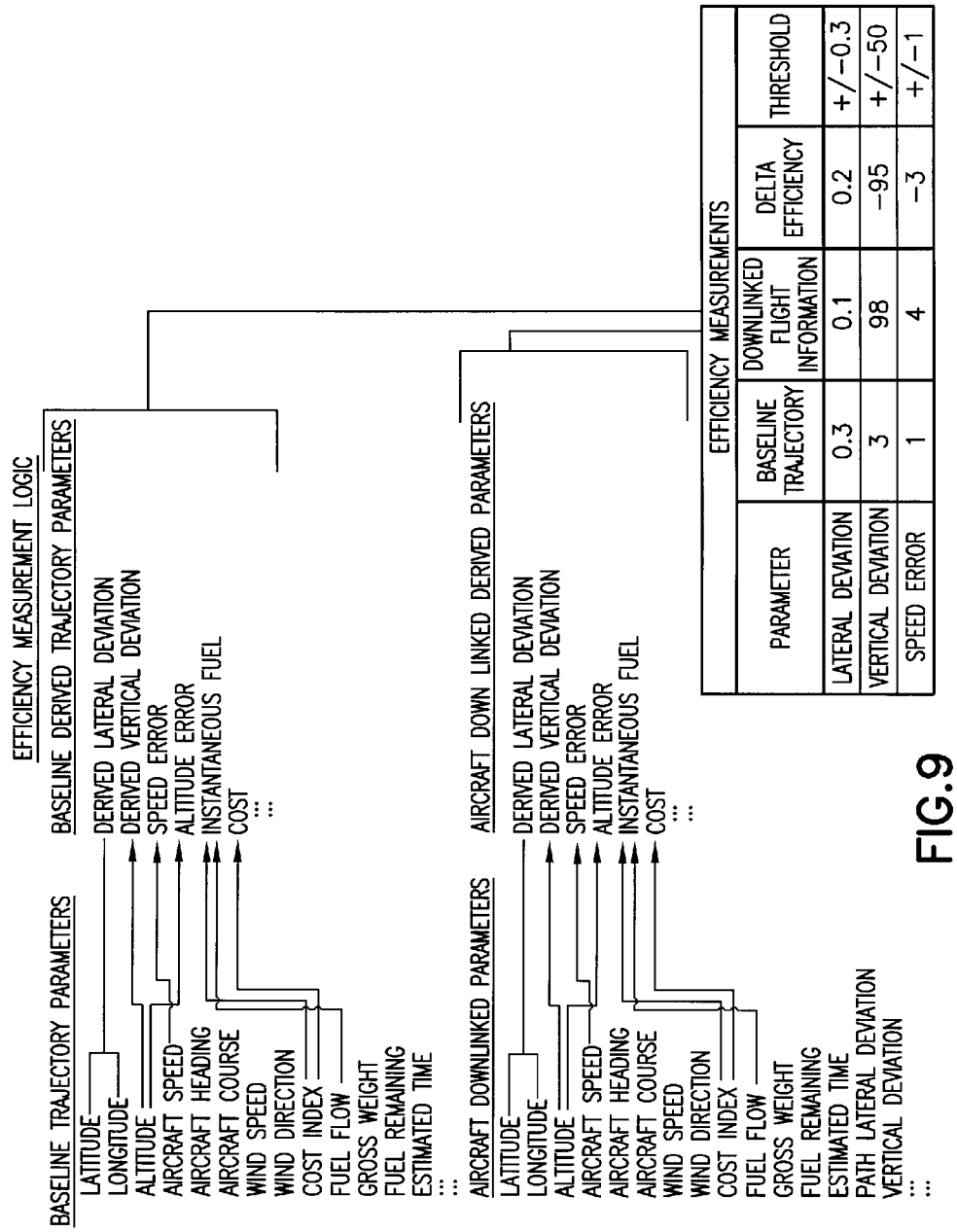
FIG. 9 is a logic diagram showing how the efficiency update process calculates efficiencies in real-time in one potential exemplary case.

The user will indicate the efficiency update rate as one of the system parameters. This is not the messaging rate, but is the interval that the real-time efficiency values will be updated and output. On these intervals, the trajectory will be queried for the particular flight(s) that are being monitored. The values for all the different points on the trajectory will be updated. The resulting values are compared against previous values as well as applied to cumulative values. This is depicted in FIG. 9. An indication of the overall accuracy of those values will also be given, based on the inputs into the MPI calculations, the application of historical efficiency coefficients and any relevant information from the trajectory predictor. In the example shown in FIG. 9, it can be seen that the threshold for vertical deviation has been exceeded (i.e., delta efficiency>threshold).

The system described above provides the capability to measure aircraft efficiency in real-time and provides real-time monitoring of aircraft performance and efficiency. These real-time efficiency calculations can then be used to provide a more complete or customized efficiency picture when combined with historical data and post-analysis data. In addition, this system also provides a means for identifying potential increased-efficiency opportunities and then notifying other interested systems that such opportunities are available.

While a process for analyzing aircraft performance efficiency has been described with reference to an implementation having a specific architecture and a specific order of processing, it will be understood by those skilled in the art that various changes may be made and equivalents may be substituted for elements thereof. In addition, many modifications may be made to adapt a particular situation to the teachings herein without departing from the essential scope thereof. Therefore it is intended that the claims not be limited to the particular embodiments disclosed.

As used in the claims, the term "system" should be construed broadly to encompass a system having at least one or multiple processors, and which may have two or more interconnected computers or processors.

The invention claimed is:

1. A method for real-time monitoring of aircraft performance and efficiency, comprising the following steps performed by one or more processors during an aircraft flight of interest:

(a) deriving an efficiency baseline for the aircraft's intended trajectory based on at least baseline trajectory profile data, said efficiency baseline comprising respective baseline values for a plurality of efficiency parameters;

(b) establishing updated trajectory profile data for said aircraft flight of interest;

(c) deriving updated values for said efficiency parameters from said updated trajectory profile data;

(d) for each efficiency parameter being monitored, determining the value difference between a baseline value and an updated value; and (e) determining whether any of said value differences exceed respective thresholds.

2. The method as recited in claim 1, further comprising the following steps performed during said aircraft flight of interest if a determination is made in step (e) that a difference between baseline and updated values of an efficiency parameter exceeds said respective threshold:

(f) setting a new efficiency baseline and a new threshold; and (g) determining whether a messaging profile for the aircraft flight of interest should be changed.

3. The method as recited in claim 1, further comprising the following step performed during said aircraft flight of interest:

calculating a new value for a messaging profile index that has multiple possible values respectively representing different levels of accuracy of real-time efficiency monitoring of said aircraft flight of interest.

4. The method as recited in claim 1, further comprising the following steps performed during said aircraft flight of interest:

adjusting the messaging profile in accordance with a new value of the messaging profile index.

5. The method as recited in claim 1, further comprising activating a notify user function if a determination is made in step (e) that the difference between baseline and updated values of any efficiency parameter exceeds said respective threshold.

6. The method as recited in claim 1, further comprising the following steps performed after said aircraft flight of interest is completed:

comparing the updated values for said efficiency parameters derived during said aircraft flight of interest with actual values for said efficiency parameters measured after said aircraft flight of interest is completed; and determining updated efficiency coefficients based at least in part on differences between said updated and actual values for said efficiency parameters, wherein one or more of said updated efficiency coefficients is used to derive said efficiency baseline in step (a).

7. The method as recited in claim 1, wherein step (c) comprises determining specific changes in efficiency that will result from a last received message.

8. The method as recited in claim 1, wherein said plurality of efficiency parameters are dynamically determined based on available data or other selection criteria.

9. A system for real-time monitoring of aircraft performance and efficiency which is programmed to perform the following operations during an aircraft flight of interest:

(a) deriving an efficiency baseline for the aircraft's intended trajectory based on at least baseline trajectory profile data, said efficiency baseline comprising respective baseline values for a plurality of efficiency parameters;

(b) establishing updated trajectory profile data for said aircraft flight of interest;

(c) deriving updated values for said efficiency parameters from said updated trajectory profile data;

(d) for each efficiency parameter being monitored, determining the value difference between a baseline value and an updated value; and (e) determining whether any of said value differences exceed respective thresholds.

10. The system as recited in claim 9, further programmed to activate a notify user function if a determination is made in operation (e) that the difference between baseline and updated values of any efficiency parameter exceeds said respective threshold.

11. The system as recited in claim 9, further programmed to perform the following operations after said aircraft flight of interest is completed:

comparing the updated values for said efficiency parameters derived during said aircraft flight of interest with actual values for said efficiency parameters measured after said aircraft flight of interest is completed; and determining updated efficiency coefficients based at least in part on differences between said updated and actual values for said efficiency parameters, wherein one or more of said updated efficiency coefficients is used to derive said efficiency baseline in operation (a).

12. The system as recited in claim 9, wherein operation (c) comprises determining specific changes in efficiency that will result from a last received message.

13. The system as recited in claim 9, wherein said plurality of efficiency parameters are dynamically determined based on available data or other selection criteria.

14. A method for real-time monitoring of efficiency-gaining opportunities and unrealized efficiencies for optimization of aircraft performance, comprising the following steps performed by one or more processors during an aircraft flight of interest:

(a) storing optimized values for a plurality of efficiency parameters, said optimized values being a function of one or more optimized flight trajectories for said aircraft flight of interest;

(b) establishing updated trajectory profile data for said aircraft flight of interest;

(c) deriving updated values for said efficiency parameters from said updated trajectory profile data;

(d) for each efficiency parameter being monitored, determining the value difference between an optimized value and an updated value; and (e) determining whether any of said value differences exceed respective thresholds.

15. The method as recited in claim 14, further comprising the following steps performed during said aircraft flight of interest:

calculating a new value for a messaging profile index that has multiple possible values respectively representing different levels of accuracy of real-time efficiency monitoring of said aircraft flight of interest.

16. The method as recited in claim 14, further comprising the following steps performed during said aircraft flight of interest:

adjusting a messaging profile in accordance with a new value of the messaging profile index.

17. The method as recited in claim 14, further comprising activating a notify user function if a determination is made in step (e) that the difference between baseline and updated values of any efficiency parameter exceeds its threshold.

18. A system for real-time monitoring of efficiency-gaining opportunities and unrealized efficiencies opportunities for optimization of aircraft performance, said system being programmed to perform the following operations during an aircraft flight of interest:
   (a) storing optimized values for a plurality of efficiency parameters, said optimized values being a function of one or more optimized flight trajectories for said aircraft flight of interest;
   (b) establishing updated trajectory profile data for said aircraft flight of interest;
   (c) deriving updated values for said efficiency parameters from said updated trajectory profile data;
   (d) for each efficiency parameter being monitored, determining the value difference between an optimized value and an updated value; and
   (e) determining whether any of said value differences exceed respective thresholds.

19. The system as recited in claim 18, further programmed to calculate a new value for a messaging profile index that has multiple possible values respectively representing different levels of accuracy of real-time efficiency monitoring of said aircraft flight of interest.

20. The system as recited in claim 18, further programmed to adjust a messaging profile in accordance with a new value of the messaging profile index.

21. The system as recited in claim 18, further programmed to activate a notify user function if a determination is made in step (e) that the difference between optimized and updated values of any efficiency parameter exceeds said respective threshold.

* * * * *